(12) United States Patent
Miller et al.

(10) Patent No.: US 12,017,894 B2
(45) Date of Patent: Jun. 25, 2024

(54) MECHANICAL BRAKE

(71) Applicant: PACCAR Inc, Bellevue, WA (US)

(72) Inventors: Jonathan Miller, Bellevue, WA (US); Jacob Conley, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 776 days.

(21) Appl. No.: 17/200,395

(22) Filed: Mar. 12, 2021

(65) Prior Publication Data
US 2022/0289532 A1 Sep. 15, 2022

(51) Int. Cl.
| | | |
|---|---|---|
| *B66D 1/14* | (2006.01) | |
| *B66D 1/58* | (2006.01) | |
| *B66D 5/14* | (2006.01) | |
| *F16D 13/38* | (2006.01) | |
| *F16D 43/21* | (2006.01) | |

(52) U.S. Cl.
CPC ............... *B66D 1/14* (2013.01); *B66D 1/58* (2013.01); *B66D 5/14* (2013.01); *F16D 13/38* (2013.01); *F16D 43/213* (2013.01); *B66D 2700/03* (2013.01)

(58) Field of Classification Search
CPC ... B66D 1/14; B66D 1/58; B66D 5/14; B66D 2700/03; F16D 43/213
See application file for complete search history.

(56) References Cited

U.S. PATENT DOCUMENTS

| | | | | |
|---|---|---|---|---|
| 3,756,359 | A | | 9/1973 | Suez et al. |
| 4,128,145 | A | * | 12/1978 | Euler ...................... F16D 59/02 188/170 |
| 4,482,105 | A | * | 11/1984 | Noda ................... A01K 89/053 242/312 |
| 5,261,646 | A | | 11/1993 | Telford |
| 5,533,712 | A | * | 7/1996 | Fujikawa ................. B66D 1/58 310/78 |
| 2018/0347643 | A1 | * | 12/2018 | Itomi ...................... F16D 15/00 |

\* cited by examiner

*Primary Examiner* — Huan Le
(74) *Attorney, Agent, or Firm* — Seed IP Law Group LLP

(57) ABSTRACT

A brake or a clutch includes a central shaft, an output-side threaded driver, an output brake plate, an input brake plate, and an input-side threaded driver. The output-side threaded driver and the input-side threaded driver are rotationally locked to the central shaft, such as by splines. The output-side threaded driver is threaded to the output brake plate and the input-side threaded driver is threaded to the input brake plate. The output brake plate is threaded to the input brake plate in a direction opposite the threaded engagement of the drivers to the brake plates. The brake or clutch may include two stator plates and three friction discs located between the output brake plate and the input brake plate.

20 Claims, 10 Drawing Sheets

MECHANICAL BRAKE

BACKGROUND

Technical Field

The present disclosure relates generally to mechanical brake systems and, more particularly, to mechanical brake systems for selectively coupling a source of mechanical power to a winch, hoist, or other similar device.

Description of the Related Art

Various mechanical brake and/or clutch systems for coupling power sources to winches, hoists, and other similar devices are commercially available. One example of such systems is referred to as a "Weston-style brake." Generally, such mechanical brake systems allow selective mechanical coupling and engagement between the power source and the winch, hoist, or other similar device. Nevertheless, there remains room for improvement in such mechanical braking systems.

BRIEF SUMMARY

A system may be summarized as comprising: a central shaft to be coupled to a source of mechanical power; an input brake plate; an output brake plate coupled to a mechanical device to be powered by the source of mechanical power; and a stator plate located between the input brake plate and the output brake plate; wherein when the source of mechanical power applies a first input torque to the central shaft, the first input torque is transmitted from the central shaft through the output brake plate to the mechanical device and drives operation of the mechanical device in a forward direction; wherein when the source of mechanical power applies a second input torque to the central shaft, the second input torque is transmitted from the central shaft to the input brake plate to allow operation of the mechanical device in a reverse direction; and wherein when the source of mechanical power does not apply a torque to the central shaft and the mechanical device is biased toward the reverse direction, the mechanical device applies a third input torque to the output brake plate, the stator plate is compressed between the input brake plate and the output brake plate, and compression of the stator plate between the input brake plate and the output brake plate prevents rotation of the output brake plate.

The system may be a brake or a clutch. The mechanical device may be a winch or a hoist. The system may not include a ratchet. When the source of mechanical power applies the first input torque to the central shaft, compression of the stator plate between the input brake plate and the output brake plate may be reduced. When the source of mechanical power applies the second input torque to the central shaft, compression of the stator plate between the input brake plate and the output brake plate may be controlled to allow operation of the mechanical device in the reverse direction. When the source of mechanical power does not apply a torque to the central shaft and the mechanical device is biased toward the forward direction, the mechanical device may apply a fourth input torque to the output brake plate that drives rotation of the output brake plate, the central shaft, and the input brake plate.

A system may be summarized as comprising: a central shaft to be coupled to a source of mechanical power; an input-side driver coupled to an input end portion of the central shaft; an input brake plate coupled to the input-side driver; an output-side driver coupled to an output end portion of the central shaft; an output brake plate coupled to the output-side driver, to the input brake plate, and to a mechanical device to be powered by the source of mechanical power; and a stator plate located between the input brake plate and the output brake plate; wherein when the source of mechanical power applies a first input torque to the central shaft, the first input torque is transmitted from the central shaft to the output-side driver, through the output-side driver to the output brake plate, and through the output brake plate to the mechanical device to drive operation of the mechanical device in a forward direction; wherein when the source of mechanical power applies a second input torque to the central shaft, the second input torque is transmitted from the central shaft to the input-side driver and through the input-side driver to the input brake plate to allow operation of the mechanical device in a reverse direction; and wherein when the source of mechanical power does not apply a torque to the central shaft and the mechanical device is biased toward the reverse direction, the mechanical device applies a third input torque to the output brake plate, the stator plate is compressed between the input brake plate and the output brake plate, and compression of the stator plate between the input brake plate and the output brake plate prevents rotation of the output brake plate.

The input-side driver may be rotationally locked to the input end portion of the central shaft and the output-side driver may be rotationally locked to the output end portion of the central shaft. The output brake plate may be threaded to the output-side driver and the input brake plate may be threaded to the input-side driver. A first handedness of a first threaded engagement of the output brake plate to the output-side driver may match a second handedness of a second threaded engagement of the input brake plate to the input-side driver. The output brake plate may be threaded to the input brake plate and a third handedness of a third threaded engagement of the output brake plate to the input brake plate may be opposite to the first handedness and the second handedness. The stator plate may be a first stator plate and the system may further comprise: a second stator plate located between the input brake plate and the output brake plate; a first friction disc located between the input brake plate and the first stator plate; a second friction disc located between the first stator plate and the second stator plate; and a third friction disc located between the second stator plate and the output brake plate.

A method of operating a system including a central shaft, an input brake plate, an output brake plate coupled to a mechanical device, and a stator plate located between the input brake plate and the output brake plate may be summarized as comprising: applying a forward input torque to the central shaft; transmitting the forward input torque from the central shaft through the output brake plate to the mechanical device, thereby driving forward operation of the mechanical device; removing the forward input torque from the central shaft, thereby allowing the mechanical device to bias the output brake plate in a reverse direction, thereby causing the stator plate to be compressed between the input brake plate and the output brake plate, thereby preventing rotation of the output brake plate; applying a reverse input torque to the central shaft; and transmitting the reverse input torque from the central shaft to the input brake plate to allow operation of the mechanical device in reverse.

Applying a forward input torque to the central shaft may reduce compression of the stator plate between the input brake plate and the output brake plate and applying a reverse input torque to the central shaft may control compression of the stator plate between the input brake plate and the output brake plate to allow operation of the mechanical device in reverse. The method may further comprise operating the mechanical device to bias the output brake plate in a forward direction, thereby driving rotation of the output brake plate, the central shaft, and the input brake plate.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure. Various examples of suitable dimensions of components and other numerical values are provided herein. Such dimensions are accurate to within standard manufacturing tolerances unless stated otherwise.

Figure 1:
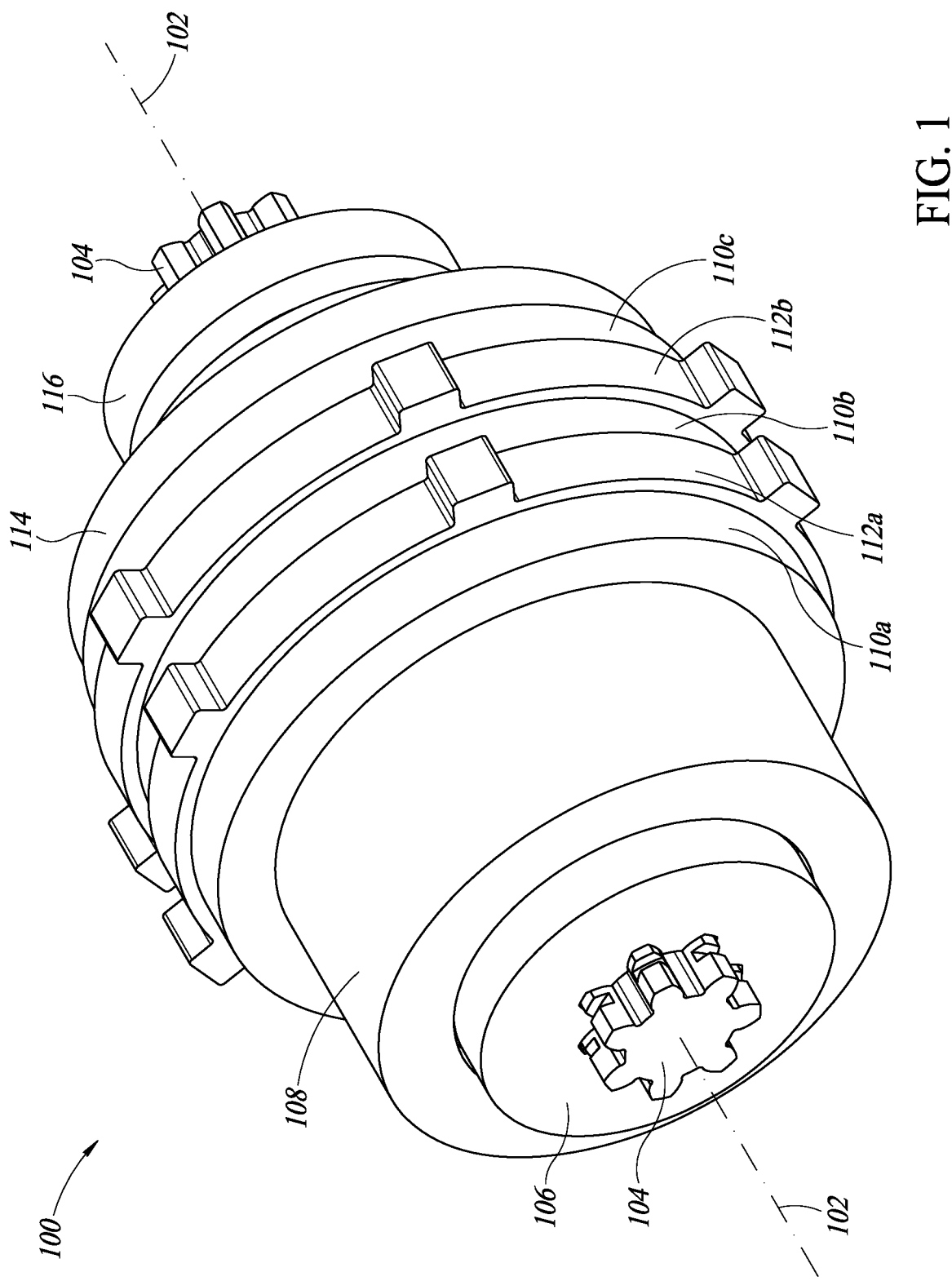
FIG. 1 illustrates a first perspective view of components of a mechanical brake coupled to one another in an operational configuration.
Figure 2:
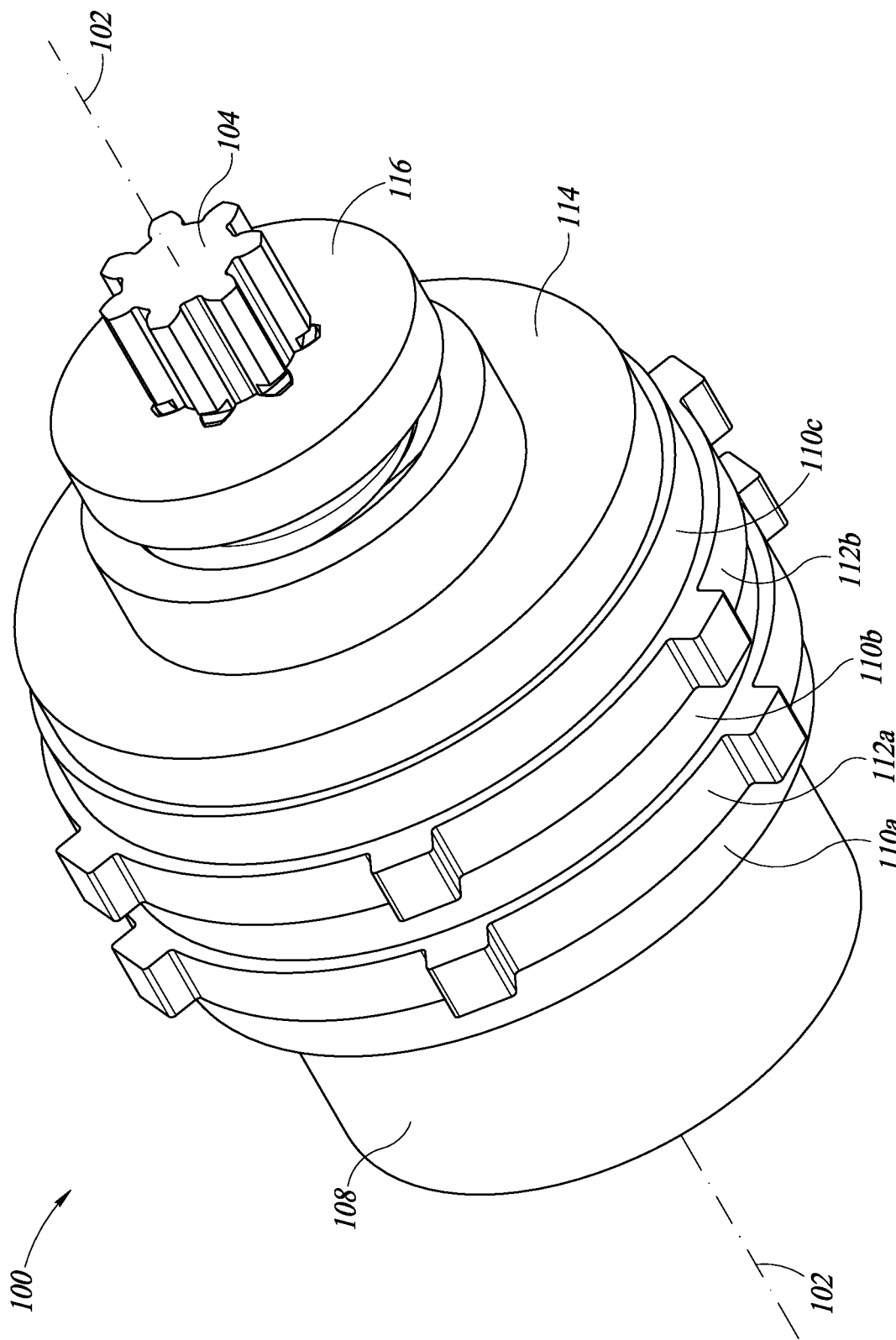
FIG. 2 illustrates a second perspective view of components of a mechanical brake coupled to one another in an operational configuration.
Figure 3:
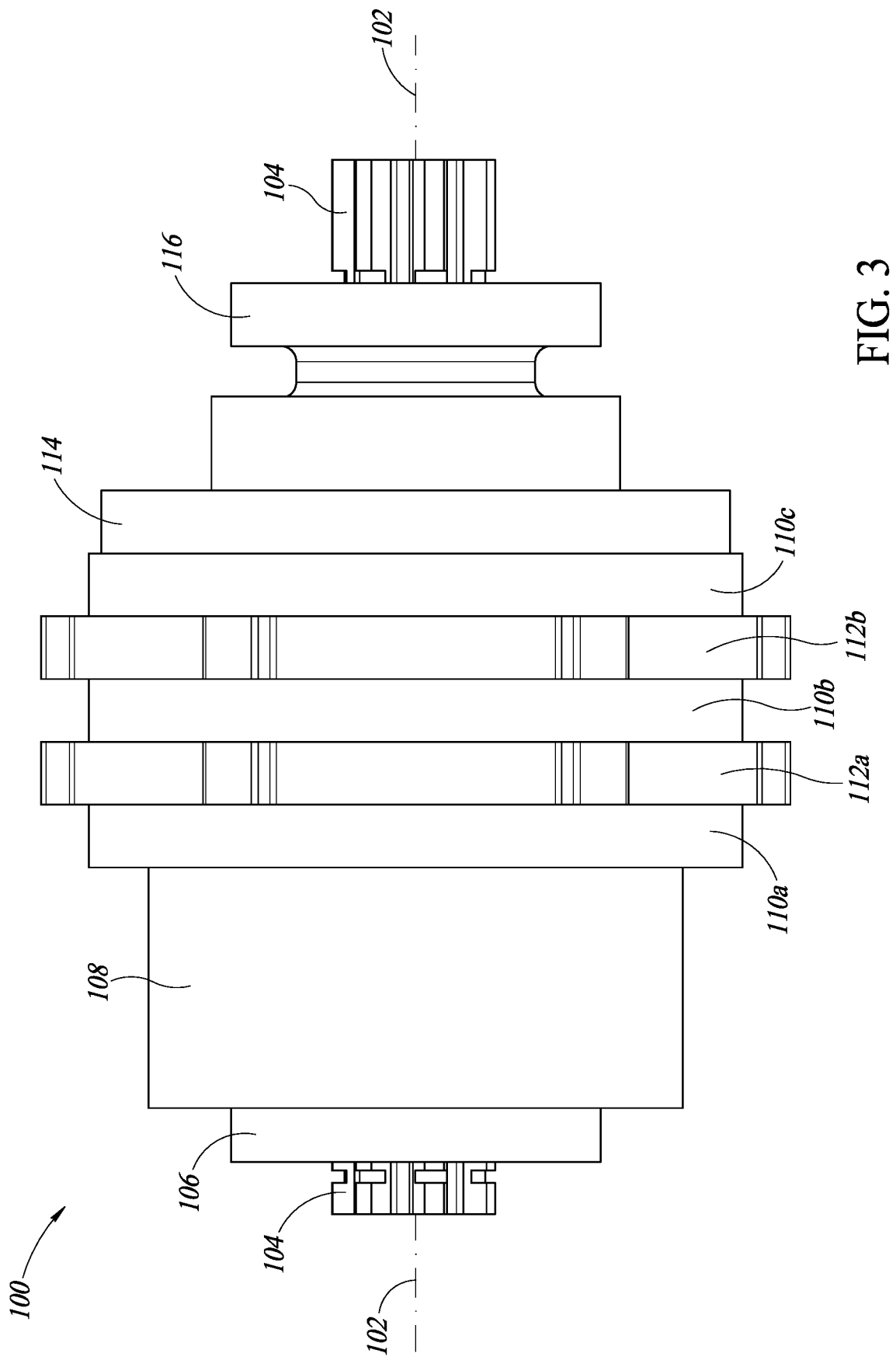
FIG. 3 illustrates a side view of components of a mechanical brake coupled to one another in an operational configuration.

FIG. 1 illustrates a perspective view of internal components of a mechanical clutch or brake 100 coupled to one another in an operational configuration, looking generally from an output end thereof toward an input end thereof. As illustrated in FIG. 1, the components of the mechanical brake 100 illustrated in FIG. 1 have a collective central longitudinal axis 102 that extends from a first, input end of the components of the mechanical brake 100 to a second, output end of the components of the mechanical brake 100. Each of the components of the mechanical brake 100 illustrated in FIG. 1 has its own central longitudinal axis, each of which are coincident with one another and coincident with the collective central longitudinal axis 102. FIG. 2 illustrates another perspective view of the components of the mechanical brake 100, looking generally from the input end thereof toward the output end thereof. FIG. 3 illustrates a side view of the components of the mechanical brake 100 with the output end thereof at the left in the drawing and the input end thereof at the right in the drawing.

As illustrated in FIGS. 1-3, the components of the mechanical brake 100 include a central shaft 104, which also functions as an input shaft, through which rotational movement and/or a torque can be applied to other components, and which includes a splined shaft that extends all the way through the other illustrated components from the input end thereof to the output end thereof. As illustrated in FIGS. 1-3, the components of the mechanical brake 100 also include, generally in order from the output end thereof to the input end thereof, an output-side end cap or threaded driver 106, an output brake plate 108, an alternating series of friction discs 110a, 110b, and 110c, and stator plates 112a and 112b, an input brake plate 114, and an input-side end cap or threaded driver 116. Such components may be housed together and collectively within a housing or other cover, to which they may be mounted in a variety of ways. Some of the constraints the housing applies to the components of the mechanical brake 100 are described elsewhere herein.

Figure 4:
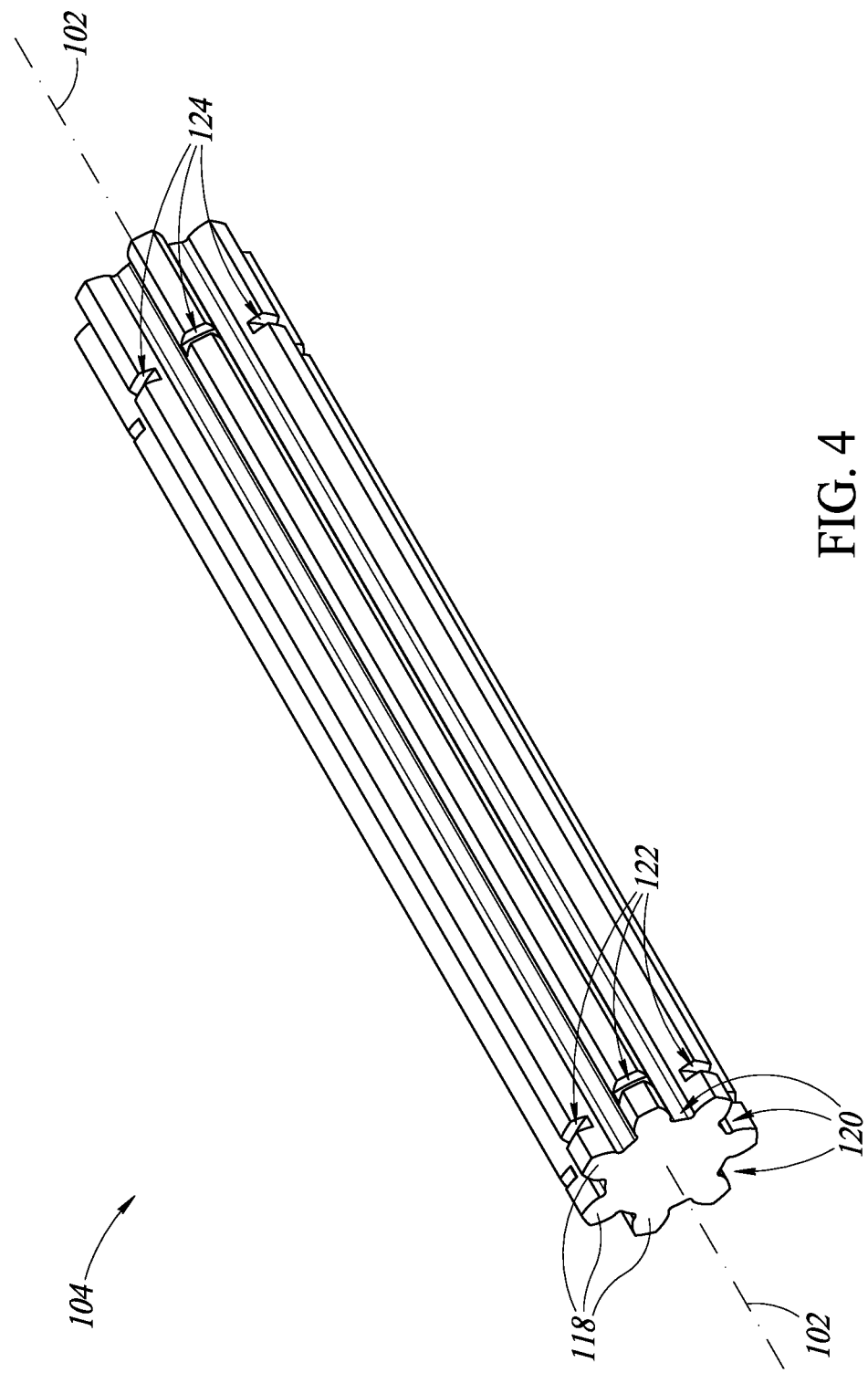
FIG. 4 illustrates a perspective view of an input shaft of a mechanical brake.

FIG. 4 illustrates a perspective view of the central shaft 104 separated from the rest of the components of the brake 100 to illustrate additional features thereof. As illustrated in FIG. 4, the central shaft 104 includes an externally-splined shaft that has ridges 118 alternating with grooves 120 around an outer circumferential surface thereof. Each of the ridges and grooves extends along a length of the central shaft 104, in a direction and along an axis parallel to the central longitudinal axis 102. The splined shaft and the ridges and grooves thereof allow the central shaft 104 to mechanically engage with other components, such as by engaging or meshing the ridges and grooves thereof to complementary ridges and grooves of the other components. As further illustrated in FIG. 4, the central shaft 104 includes a first, output-end circumferential groove 122 that extends circumferentially around an output end portion of the central shaft 104, and a second, input-end circumferential groove 124 that extends circumferentially around an input end portion of the central shaft 104, where each of the grooves 122 and 124 extend or are cut into peripheral, distal end portions of the ridges 118 and extend radially inward into the central shaft 104 through the ridges 118.

Figure 6:
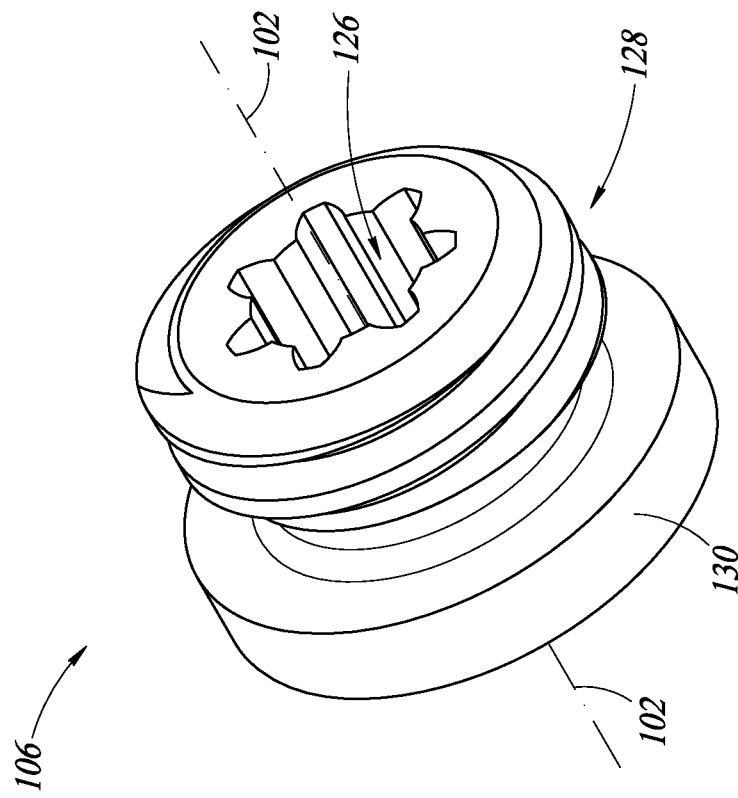
FIG. 6 illustrates a second perspective view of the output-side threaded driver of FIG. 5.
Figure 5:
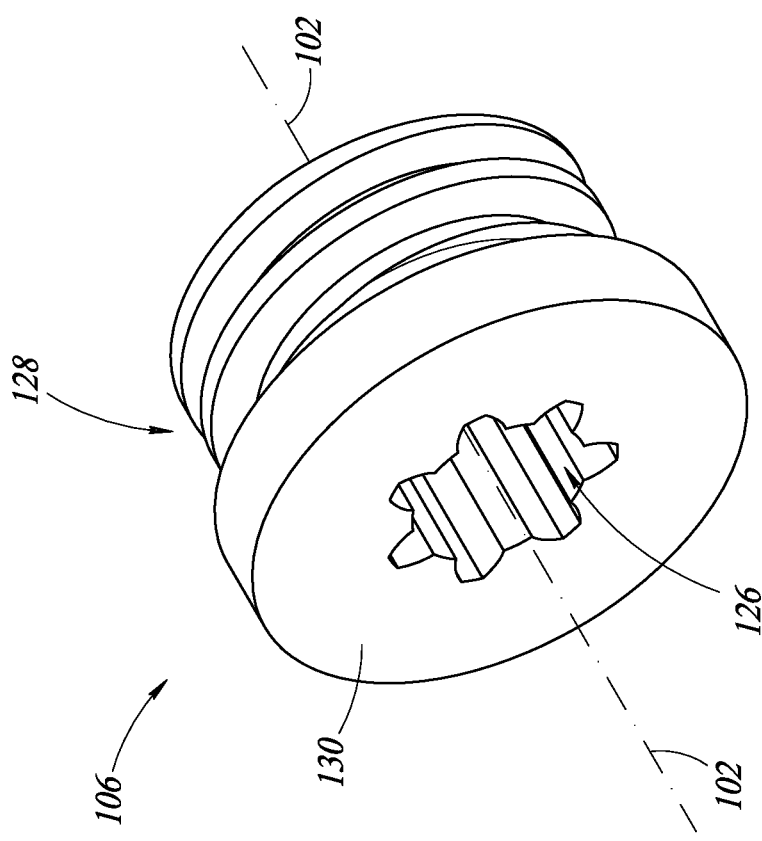
FIG. 5 illustrates a first perspective view of an output-side threaded driver of a mechanical brake.

FIGS. 5 and 6 illustrate different perspective views of the output-side threaded driver 106. As illustrated in FIGS. 5 and 6, the output-side threaded driver 106 is hollow, having a conduit that extends longitudinally therethrough, from a first opening at a first longitudinal end thereof to a second opening at a second longitudinal end thereof opposite the first. An internal surface 126 of the output-side threaded driver 106, which is an outer surface of, and defines an outer boundary of, the conduit extending therethrough, is internally-splined, having ridges circumferentially alternating with grooves around the internal surface 126, where the ridges and grooves of the internal surface 126 are complementary to the ridges 118 and grooves 120. Each of the ridges and grooves of the internal surface 126 of the output-side threaded driver 106 extends along a length of the output-side threaded driver 106, in a direction and along an axis parallel to the central longitudinal axis 102. The internal splines and the ridges and grooves thereof allow the output-side threaded driver 106 to mechanically engage the central shaft 104, for example, such that the output-side threaded driver 106 cannot rotate with respect to the central shaft 104 but can translate along the length of the central shaft 104, such as by engaging or meshing the ridges and grooves of the internal surface 126 of the output-side threaded driver 106 to the complementary ridges 118 and grooves 120.

As also illustrated in FIGS. 5 and 6, the output-side threaded driver 106 has an outer surface that includes outer right-handed threads 128 along a first end portion thereof, which is the end thereof closer to the input end of the brake when the components of the brake 100 are assembled in an operating configuration, and a head portion 130 at a second end portion thereof opposite the first, which is the end thereof closer to the output end of the brake when the components of the brake 100 are assembled in an operating configuration, where the head portion 130 has a larger outside diameter than the threads 128.

Figure 8:
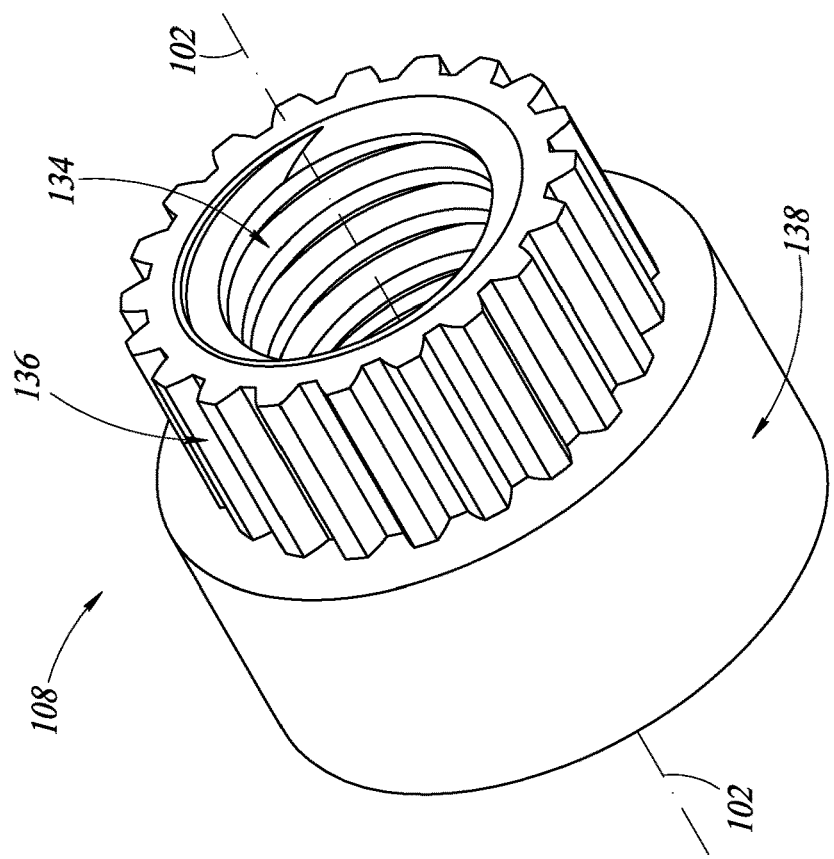
FIG. 8 illustrates a second perspective view of the output brake plate of FIG. 7.
Figure 7:
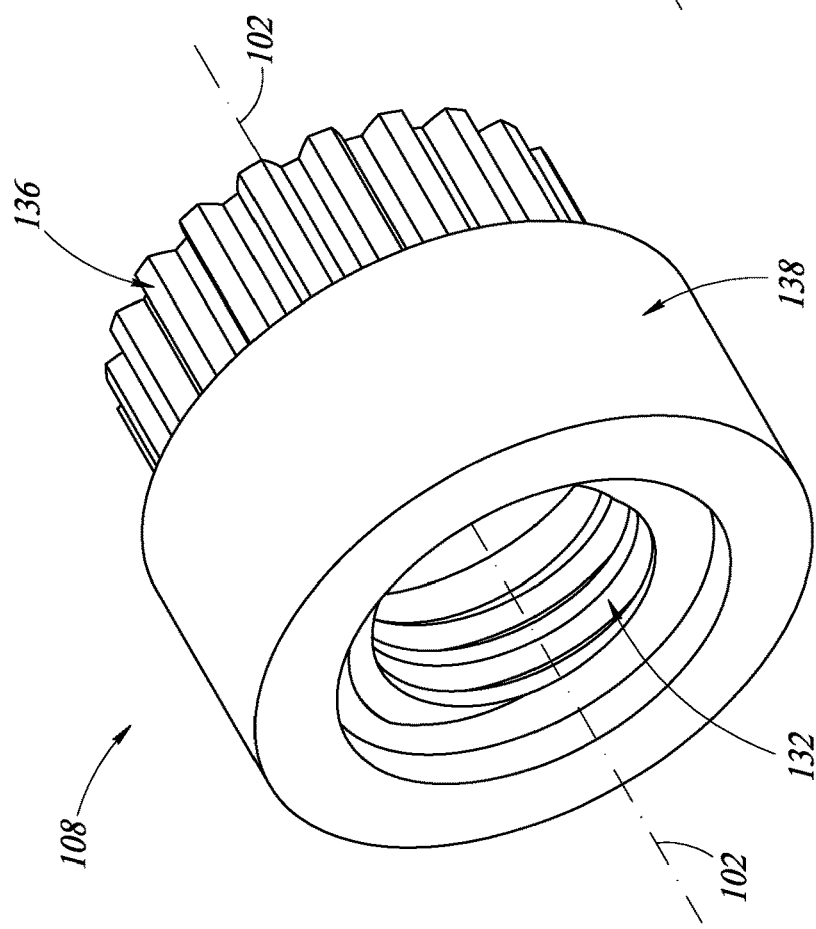
FIG. 7 illustrates a first perspective view of an output brake plate of a mechanical brake.

FIGS. 7 and 8 illustrate different perspective views of the output brake plate 108. As illustrated in FIGS. 7 and 8, the output brake plate 108 is hollow, having a conduit that extends longitudinally therethrough, from a first opening at a first longitudinal end thereof to a second opening at a second longitudinal end thereof opposite the first. An internal surface of the output brake plate 108, which is an outer surface of, and defines an outer boundary of, the conduit extending therethrough, is internally-threaded, having internal right-handed threads 132 at the first end thereof, which is the end thereof closer to the output end of the brake when the components of the brake 100 are assembled in an operating configuration, and internal left-handed threads 134 at the second end thereof, which is the end thereof closer to the input end of the brake when the components of the brake 100 are assembled in an operating configuration. The internal right-handed threads 132 are complementary to the external right-handed threads 128 of the output-side threaded driver 106 such that the external right-handed threads 128 of the output-side threaded driver 106 can be threaded into and threadedly engaged and coupled to the internal right-handed threads 132 of the output brake plate 108.

The internal left-handed threads 134 allow the output brake plate 108 to mechanically engage with other components, such as by engaging or threading the left-handed threads 134 thereof over complementary threads of other components. In some embodiments, the internal left-handed threads 134 can have the same diameter, pitch, and other dimensions, as the internal right-handed threads 132, with the only difference being the handedness of the threads. As also illustrated in FIGS. 7 and 8, the output brake plate 108 has an outer, externally-splined surface 136 that has ridges alternating with grooves around an outer circumference thereof, which extends along the second end portion thereof, such that the externally-splined surface 136 surrounds the internal left-hand threads 134. Each of the ridges and grooves extends along a length of the output brake plate 108, in a direction and along an axis parallel to the central longitudinal axis 102. The externally-splined surface 136 and the ridges and grooves thereof allow the output brake plate 108 to mechanically engage with other components, such as by engaging or meshing the ridges and grooves thereof to complementary ridges and grooves of the other components. As further illustrated in FIGS. 7 and 8, the output brake plate 108 includes a head portion 138 at the first end portion thereof, such that the head portion 138 surrounds the internal right-handed threads 132, where the head portion 138 has a larger outside diameter than the externally-splined surface 136.

Figure 10:
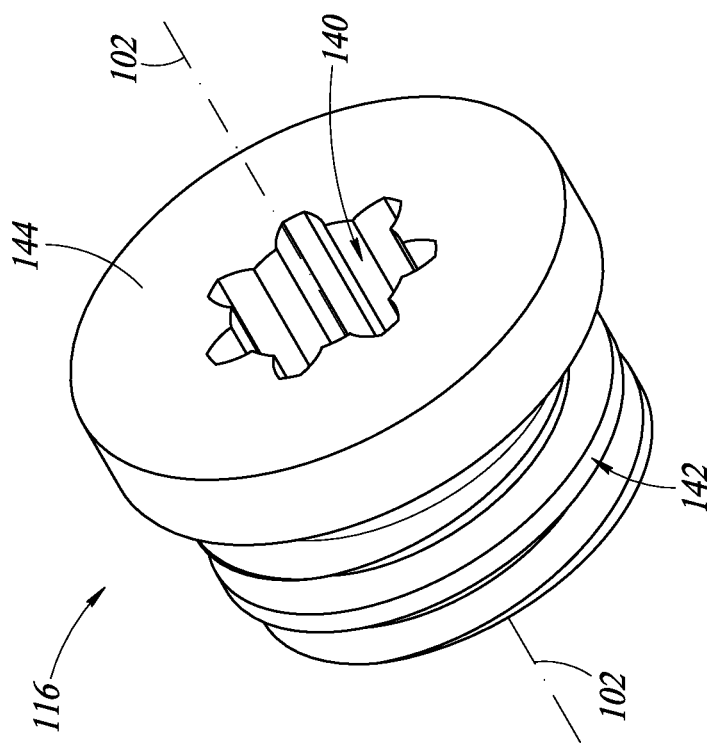
FIG. 10 illustrates a second perspective view of the input-side threaded driver of FIG. 9.
Figure 9:
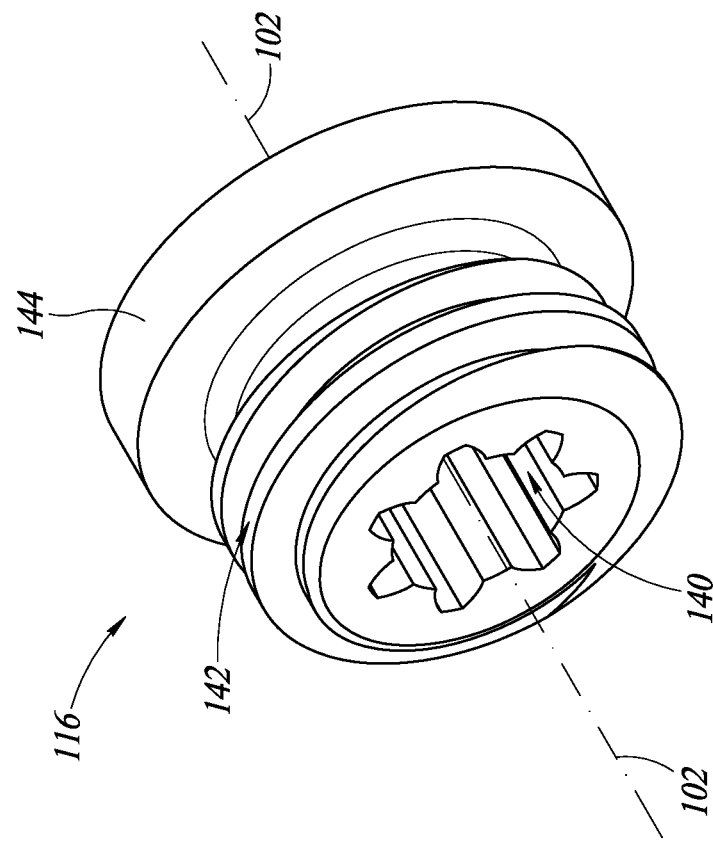
FIG. 9 illustrates a first perspective view of an input-side threaded driver of a mechanical brake.

FIGS. 9 and 10 illustrate different perspective views of the input-side threaded driver 116. As illustrated in FIGS. 9 and 10, the input-side threaded driver 116 is hollow, having a conduit that extends longitudinally therethrough, from a first opening at a first longitudinal end thereof to a second opening at a second longitudinal end thereof opposite the first. An internal surface 140 of the input-side threaded driver 116, which is an outer surface of, and defines an outer boundary of, the conduit extending therethrough, is internally-splined, having ridges circumferentially alternating with grooves around the internal surface 140, where the ridges and grooves of the internal surface 140 are complementary to the ridges 118 and grooves 120. Each of the ridges and grooves of the internal surface 140 of the input-side threaded driver 116 extends along a length of the input-side threaded driver 116, in a direction and along an axis parallel to the central longitudinal axis 102. The internal splines and the ridges and grooves thereof allow the input-side threaded driver 116 to mechanically engage the central shaft 104, for example, such that the input-side threaded driver 116 cannot rotate with respect to the central shaft 104 but can translate along the length of the central shaft 104, such as by engaging or meshing the ridges and grooves of the internal surface 140 of the input-side threaded driver 116 to the complementary ridges 118 and grooves 120.

As also illustrated in FIGS. 9 and 10, the input-side threaded driver 116 has an outer surface that includes outer right-handed threads 142 along a first end portion thereof, which is the end thereof closer to the output end of the brake when the components of the brake 100 are assembled in an operating configuration, and a head portion 144 at a second end portion thereof opposite the first, which is the end thereof closer to the input end of the brake when the components of the brake 100 are assembled in an operating configuration, where the head portion 144 has a larger outside diameter than the threads 142. In some embodiments, the input-side threaded driver 116 may be identical to the output-side threaded driver 106, but in a different position and orientation when the components of the brake 100 are assembled in an operating configuration.

Figure 12:
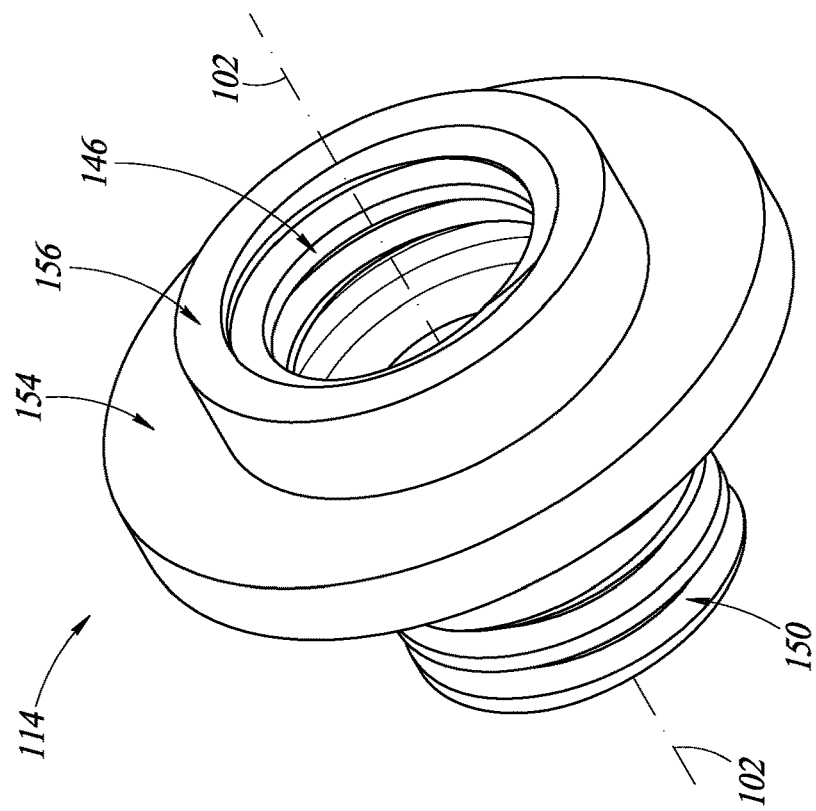
FIG. 12 illustrates a second perspective view of the input brake plate of FIG. 11.
Figure 11:
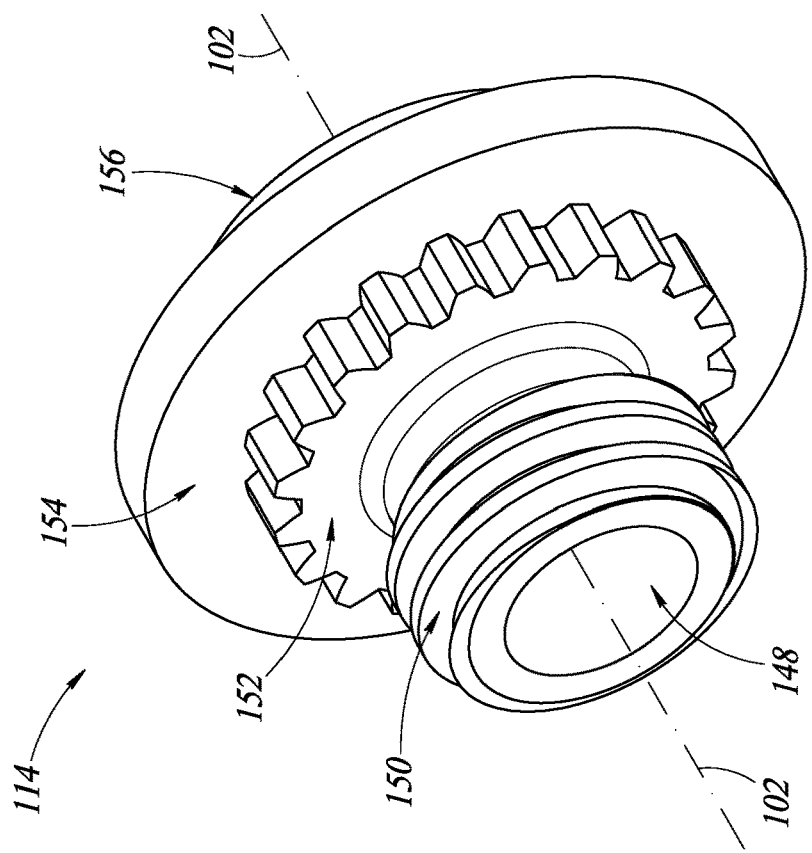
FIG. 11 illustrates a first perspective view of an input brake plate of a mechanical brake.

FIGS. 11 and 12 illustrate different perspective views of the input brake plate 114. As illustrated in FIGS. 11 and 12, the input brake plate 114 is hollow, having a conduit that extends longitudinally therethrough, from a first opening at a first longitudinal end thereof to a second opening at a second longitudinal end thereof opposite the first. An internal surface of the input brake plate 114, which is an outer surface of, and defines an outer boundary of, the conduit extending therethrough, is internally-threaded, having internal right-handed threads 146 at the first end thereof, which is the end thereof closer to the input end of the brake when the components of the brake 100 are assembled in an operating configuration. The internal surface of the input brake plate 114 also has a smooth portion 148 at the second end thereof, which is the end thereof closer to the output end of the brake when the components of the brake 100 are assembled in an operating configuration. The internal right-handed threads 146 are complementary to the external right-handed threads 142 of the input-side threaded driver 116 such that the external right-handed threads 142 of the input-side threaded driver 116 can be threaded into and threadedly engaged and coupled to the internal right-handed threads 146 of the input brake plate 114. In some embodiments, the external right-handed threads 142 of the input-side threaded driver 116 can have the same diameter, pitch, and other dimensions, as the external right-handed threads 128 of the output-side threaded driver 106. In some embodiments, the internal right-handed threads 146 of the input brake plate 114 can have the same diameter, pitch, and other dimensions, as the internal right-handed threads 132 of the output brake plate 108.

As also illustrated in FIGS. 11 and 12, the input brake plate 114 has an outer surface that includes a threaded portion 150 at the second end of the input brake plate 114, such that the threaded portion 150 surrounds the smooth portion 148 of the internal surface of the input brake plate 114. The outer surface of the input brake plate 114 also includes an externally-splined portion 152 located adjacent to the threaded portion 150, a radially-protruding ridge 154 adjacent to the externally-splined portion 152, where the radially-protruding ridge 154 extends circumferentially around the outer surface of the input brake plate 114, and a head portion 156 adjacent to the ridge 154 and at the first end of the input brake plate 114, such that the head portion 156 surrounds the internal right-handed threads 146.

The threaded portion 150 is externally-threaded, and has external left-handed threads complementary to the internal left-handed threads 134 of the internal surface of the output brake plate 108 such that the external left-handed threads of the threaded portion 150 of the input brake plate 114 can be threaded onto and threadedly engaged and coupled to the internal left-handed threads 134 of the output brake plate 108. In some embodiments, the external left-handed threads of the threaded portion 150 can have the same diameter, pitch, and other dimensions, as the external right-handed threads 142 of the input-side threaded driver 116, with the only difference being the handedness of the threads.

The externally-splined portion 152 has ridges alternating with grooves around an outer circumference thereof. Each of the ridges and grooves extends along a length of the input brake plate 114, in a direction and along an axis parallel to the central longitudinal axis 102. The externally-splined portion 152 and the ridges and grooves thereof allow the input brake plate 114 to mechanically engage with other components, such as by engaging or meshing the ridges and grooves thereof to complementary ridges and grooves of the other components. In some embodiments, the spline contour or the ridges and grooves of the externally splined portion 152 can have the same dimensions or be dimensionally identical to the spline contour or the ridges and grooves of the externally-splined outer surface 136 of the output brake plate 108. The radially-protruding ridge 154 has a larger outside diameter than the threaded portion 150, the externally-splined portion 152, and the head portion 156 of the outer surface of the input brake plate 114.

Figure 13:
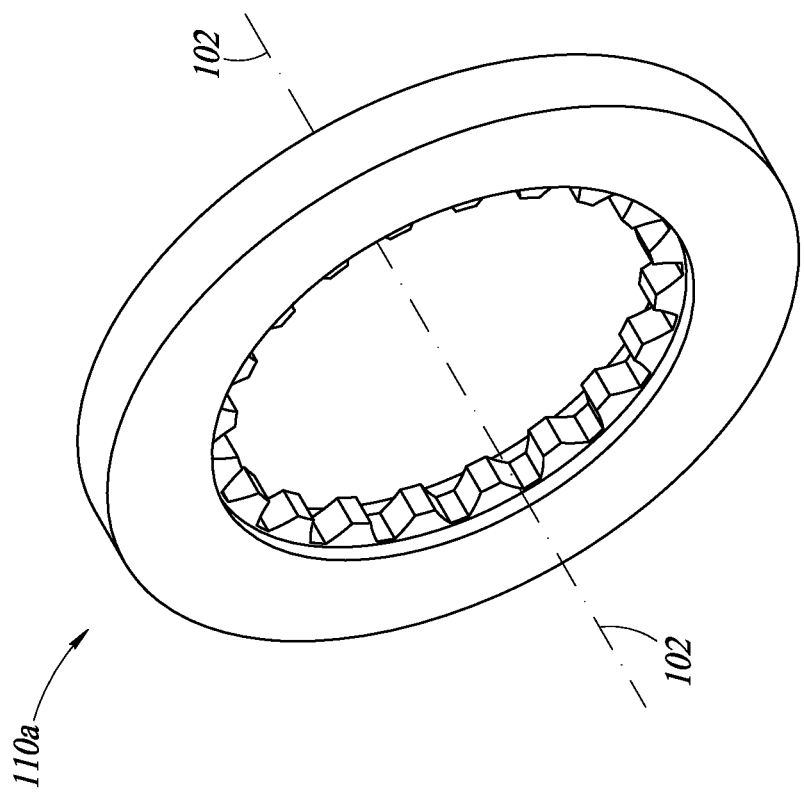
FIG. 13 illustrates a perspective view of a friction disc of a mechanical brake.

FIG. 13 illustrates the friction disc 110a, which may be identical to and have the same dimensions and features as the other friction discs, including friction discs 110b and 110c. As illustrated in FIG. 13, the friction disc 110a has an overall hollow and annular shape and an internally-splined interior surface having spines or alternating ridges and grooves complementary to the externally-splined portion 152 of the outer surface of the input brake plate 114 and to the externally-splined outer surface 136 of the output brake plate 108. Thus, the internal splines of the friction disc 110a and the ridges and grooves thereof allow the friction disc 110a to mechanically engage the externally-splined portion 152 of the outer surface of the input brake plate 114 and/or the externally-splined outer surface 136 of the output brake plate 108, for example, such that the friction disc 110a cannot rotate with respect to the input brake plate 114 and/or the output brake plate 108 but can translate along the length of the input brake plate 114 and/or the output brake plate 108.

Figure 14:
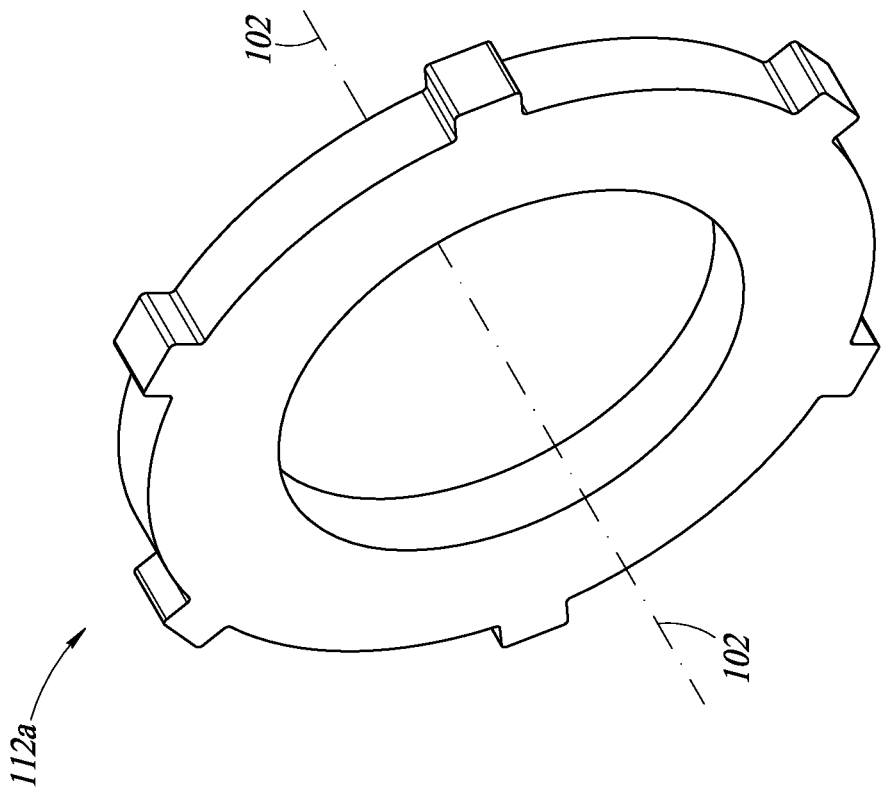
FIG. 14 illustrates a perspective view of a stator plate of a mechanical brake.

FIG. 14 illustrates the stator plate 112a, which may be identical to and have the same dimensions and features as the other stator plate(s), including the stator plate 112b. As illustrated in FIG. 14, the stator plate 112a has an overall hollow and annular shape and an external surface having ridges, protrusions, knobs, teeth, splines, or other features extending radially outward from a main body thereof.

Figure 15:
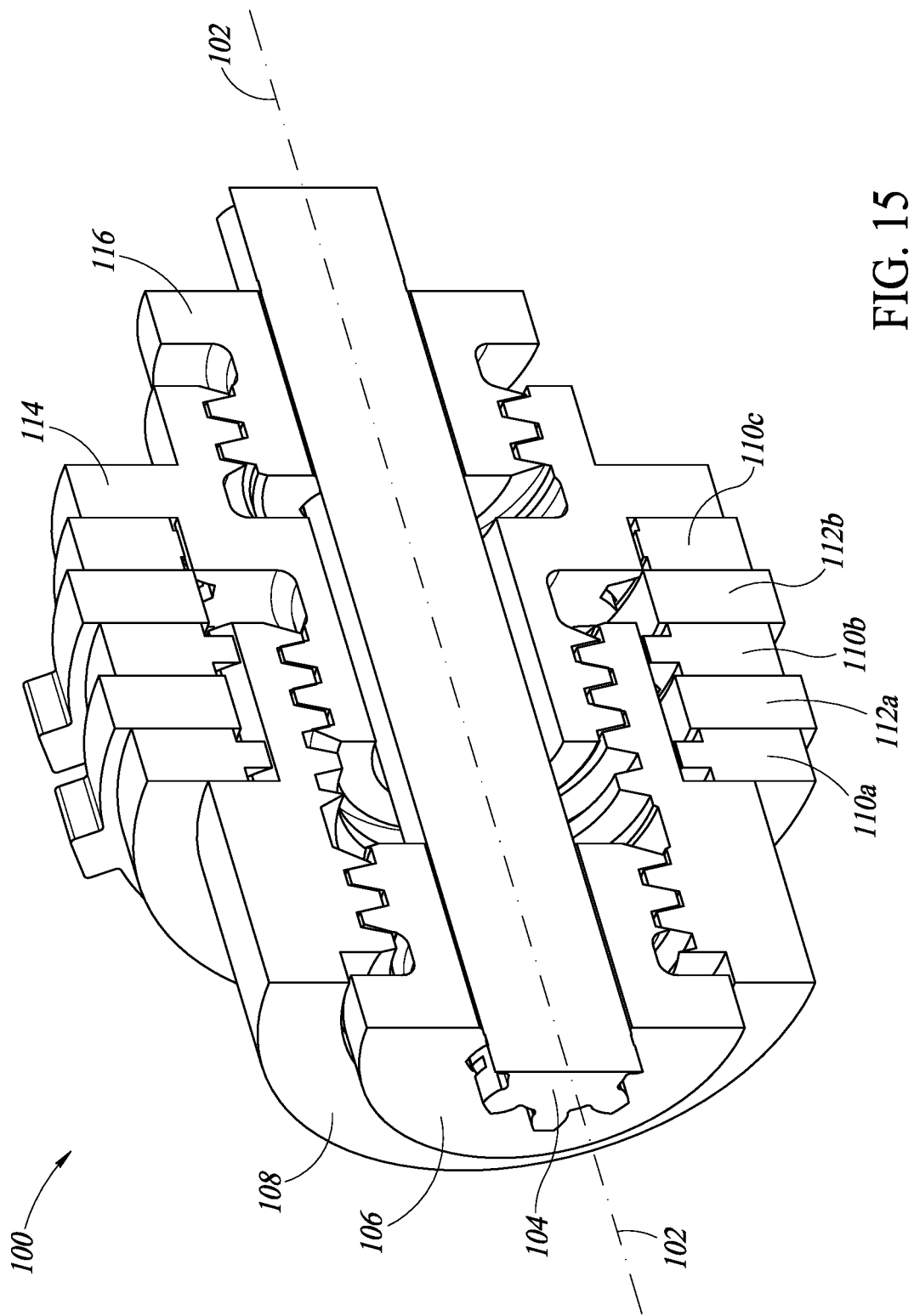
FIG. 15 illustrates a cross-sectional view of components of a mechanical brake coupled to one another in an operational configuration.

FIG. 15 illustrates a cross-sectional view of the components described herein coupled to one another in an operational configuration. As illustrated in FIG. 15, the outer splined surface of the central shaft 104 is engaged with the inner splined surfaces of the output-side threaded driver 106 and the input-side threaded driver 116. The external right-handed threads of the output-side threaded driver 106 are threaded into the internal right-handed threads of the output brake plate 108, the external right-handed threads of the input-side threaded driver 116 are threaded into the internal right-handed threads of the input brake plate 114, and the external left-handed threads of the input brake plate 114 are threaded into the internal left-handed threads of the output brake plate 108. The internally-splined surfaces of the friction discs 110a, 110b, and 110c are engaged with the outer splined surfaces of the output brake plate 108 and the input brake plate 114.

When in use, the components described herein are enclosed within a housing, and the housing may be coupled, such as bolted or otherwise mechanically secured, to a foundation or a larger piece of equipment or machinery. Internal features of the housing may engage with the external surface of the stator plates 112a, 112b, and the ridges, protrusions, or knobs thereof, such that the stator plates 112a and 112b are prevented from rotating with respect to the housing, such as about the central longitudinal axis 102. When in use, the central shaft 104 may be coupled to a motor, engine, hand-crank, or other source of mechanical power, such that the central shaft 104 is prevented from translating, such as along the central longitudinal axis 102, but can be driven by the source of mechanical power to rotate about the central longitudinal axis 102. When in use, the output brake plate 108 may be coupled to a winch, a hoist, or another similar mechanical device, such that the output brake plate 108 may be prevented from translating, such as along the central longitudinal axis 102, but rotation of the output brake plate 108 can drive operation of the winch, hoist, or other similar mechanical device, and/or a load carried by the winch, hoist, or other similar mechanical device can apply a torque to the output brake plate 108.

When the mechanical brake is in operation, the source of mechanical power can drive the central shaft 104 to rotate either clockwise or counter-clockwise about the central longitudinal axis 102. The terms "clockwise" and "counter-clockwise" are used herein to refer to rotational directions as viewed by an observer looking along the central longitudinal axis 102 from right to left in FIG. 3, that is, from the input end of the central shaft 104 and the mechanical brake as a whole toward the output end of the central shaft 104 and the mechanical brake as a whole. Generally, the components described herein are configured such that when power is supplied in a forward direction, the central shaft 104 is driven to rotate counter-clockwise, and power can be transmitted through the brake to the winch, hoist, or other device coupled to the output brake plate 108 to drive operation of such device in a forward direction, such as to pull a line of a winch or hoist in, such as to lift a load, as well as such that when power is supplied in a reverse direction, the central shaft 104 is driven to rotate clockwise, and power can be transmitted through the brake to the winch, hoist, or other device coupled to the output brake plate 108 to drive operation of such device in a reverse direction, such as to allow a line of a winch or hoist to spool out, such as to allow a load to be lowered, or to force a line of a winch or hoist to spool out, such as when a load is not coupled to the winch or hoist.

When a counter-clockwise input torque is applied to the central shaft 104 and/or the central shaft 104 is driven or urged to rotate in a counter-clockwise direction (that is, in a forward direction), the splined outer surface of the central shaft 104 urges the output-side threaded driver 106 to rotate counter-clockwise. Initially, the output brake plate 108 is not forced to rotate about the central longitudinal axis 102. Thus, the rotation of the output-side threaded driver 106 and the engagement of the right-handed threads of the output-side threaded driver 106 with the right-handed threads of the output brake plate 108 cause the output-side threaded driver 106 to thread into and move toward the output brake plate 108 until the head portion 130 of the output-side threaded driver 106 abuts and bears against the output brake plate 108, at which point, the output-side threaded driver 106 can no longer thread further into the output brake plate 108 and the output brake plate 108 is forced to rotate counter-clockwise about the central longitudinal axis 102. In this way, a counter-clockwise torque can be transmitted from the central shaft 104 to the output brake plate 108 and thereby to the winch, hoist or other mechanical device coupled thereto.

If the output brake plate 108 is driven to rotate in this manner, but is restrained from longitudinal translation along the central shaft 104, given the left-handed threaded engagement of the output brake plate 108 with the input brake plate 114, the input brake plate 114 is driven to travel or translate linearly and longitudinally away from the output brake plate 108 along the central longitudinal axis 102, such as toward the input end of the central shaft 104. Such movement of the input brake plate 114 causes the protruding ridge 154 to translate longitudinally away from the head portion 138 of the output brake plate, thereby at least partially releasing the friction discs 110a, 110b, and 110c and stator plates 112a and 112b that are positioned between the protruding ridge 154 of the input brake plate 114 and the head portion 138 of the output brake plate 108.

This at least partially releases a braking function of the brake. In particular, normal forces exerted between and against the head portion 138 of the output brake plate 108, the friction discs 110a, 110b, and 110c, the stator plates 112a, 112b, and the protruding ridge 154 of the input brake plate 114, that is, braking forces, may be decreased to a level allowing the source of mechanical power to overcome the braking force or "drag" the brake, but not to zero. Put another way, compression of the friction discs 110a, 110b, and 110c, and of the stator plates 112a, 112b between the input brake plate 114 and the output brake plate 108 may be decreased, thereby decreasing frictional forces between the output brake plate 108 and the friction disc 110a, between the friction discs 110a, 110b, 110c and the stator plates 112a, 112b, and between the friction disc 110c and the input brake plate 114 to levels that allow components of the brake to rotate with respect to the stator plates 112a, 112b, without completely eliminating the friction and resistance between such components.

Further, when a counter-clockwise input torque is applied to the central shaft 104 and/or the central shaft 104 is driven or urged to rotate in a counter-clockwise direction (that is, in a forward direction), the splined outer surface of the central shaft 104 urges the input-side threaded driver 116 to rotate counter-clockwise. Thus, the rotation of the input-side threaded driver 116 and the engagement of the right-handed threads of the input-side threaded driver 116 with the right-handed threads of the input brake plate 114 cause the input-side threaded driver 116 to thread out of and move away from the input brake plate 114 such that the head portion 144 of the input-side threaded driver 116 does not abut or bear against the input brake plate 114. Thus, a counter-clockwise torque is not transmitted from the central shaft 104 to the input brake plate 114.

Such operation can be used, for example, to drive a winch or hoist to spool in, that is, to pull a load in, that is, to drive a winch or hoist to lift a load or pull a load toward the winch or hoist. After such an operation (e.g., when a load is suspended in air), the load may continue to apply a torque to the output brake plate 108, urging the output brake plate 108 to rotate clockwise. If, after such operation, the source of mechanical power is decoupled or disconnected from the central shaft 104, or for any reason fails or ceases to apply a torque to the central shaft 104, and if a brake as described herein is not provided, then the winch or hoist may uncontrollably spool out, that is, the load may fall, causing great risk of severe personal and/or material harm. The components of the brake 100 described herein can reduce or prevent this risk.

In particular, if, after such operation, the source of mechanical power is decoupled or disconnected from the central shaft 104, or for any reason fails or ceases to apply a torque to the central shaft 104, and the load continues to apply a torque to the output brake plate 108 urging the output brake plate 108 to rotate clockwise, then the threaded engagement of the output brake plate 108 and the input brake plate 114 would cause the input brake plate 114 to move toward the output brake plate 108. In particular, the remaining frictional forces between the output brake plate 108 and the friction disc 110a, between the friction discs 110a, 110b, 110c and the stator plates 112a, 112b, and/or between the friction disc 110c and the input brake plate 114 provide some initial resistance to rotation of the input brake plate 114 about the central longitudinal axis 102. Thus, clockwise rotation of the output brake plate 108, combined with the initial resistance to rotation of the input brake plate 114 and the left-handed threaded engagement of the output brake plate 108 to the input brake plate 114, urges the input brake plate 114 to translate longitudinally along the central longitudinal axis 102 and the central shaft 104 toward the output brake plate 108, further compressing the friction discs 110a, 110b, 110c and stator plates 112a, 112b between the head portion 138 of the output brake plate 108 and the protruding ridge 154 of the input brake plate 114, thereby increasing the resistance to rotation of the input brake plate 114 and initiating a cycle that quickly locks the brake and prevents further clockwise rotation of the output brake plate 108. That is, the output brake plate 108 and the winch, hoist, or other mechanical device coupled thereto, and any load carried thereby, are restrained against further movement by frictional engagement between the output brake plate 108 and the friction disc 110a.

After a winch, hoist, or other similar device has been driven in a forward direction, an operator may choose to drive the winch, hoist, or other similar device in a reverse direction, such as by applying a clockwise input torque to the central shaft 104. When a clockwise input torque is applied to the central shaft 104 and/or the central shaft 104 is driven or urged to rotate in a clockwise direction (that is, in a reverse direction), and a load is applied to the output brake plate 108 applying a clockwise torque thereto and urging the output brake plate 108 to rotate in a reverse direction (that is, clockwise) (such a situation may arise, for example, when a hoist carries a load in the air, at an elevated position, and an operator begins to lower the load), the splined outer surface of the central shaft 104 urges the input-side threaded driver 116 to rotate clockwise. Initially, the input brake plate 114 is not forced to rotate about the central longitudinal axis 102. Thus, the rotation of the input-side threaded driver 116 and the engagement of the right-handed threads of the input-side threaded driver 116 with the right-handed threads of the input brake plate 114 cause the input-side threaded driver 116 to thread into and move toward the input brake plate 114 until the head portion 144 of the input-side threaded driver 116 abuts and bears against the input brake plate 114, at which point, the input-side threaded driver 116 can no longer thread into the input brake plate 114 and the input brake plate 114 is forced to rotate clockwise about the central longitudinal axis 102. In this way, a torque can be transmitted from the central shaft 104 to the input brake plate 114.

During this operation, the output brake plate 108 and the input brake plate 114 and the central shaft 104 rotate in the same direction (clockwise) and at the same average speed as one another. If the speed at which the central shaft 104 and the input brake plate 114 rotate in the clockwise direction increases relative to the speed at which the output brake plate 108 rotates in the clockwise direction, then the left-handed threaded engagement of the output brake plate 108 to the input brake plate 114 causes the input brake plate 114 to move longitudinally away from the output brake plate 108, thereby reducing friction within the brake and allowing the speed at which the output brake plate 108 rotates in the clockwise direction to increase. If the speed at which the central shaft 104 and the input brake plate 114 rotate in the clockwise direction decreases relative to the speed at which the output brake plate 108 rotates in the clockwise direction, then the left-handed threaded engagement of the output brake plate 108 to the input brake plate 114 causes the input brake plate 114 to move longitudinally toward the output brake plate 108, thereby increasing friction within the brake and forcing the speed at which the output brake plate 108 rotates in the clockwise direction to decrease. Thus, an average speed of clockwise rotation of the output brake plate 108 is limited by (and to) an average speed of clockwise rotation of the central shaft 104. Thus, a load carried by a hoist can be lowered at a desired rate in a straightforward manner.

If a clockwise input torque is applied to the central shaft 104 and/or the central shaft 104 is driven or urged to rotate in a clockwise direction (that is, in a reverse direction), but a load is not independently applied to the output brake plate 108 and the output brake plate 108 is not independently urged to rotate in a reverse direction (that is, clockwise) (such a situation may arise, for example, when a hoist does not carry a load and an operator begins to spool out the hoist), the engagement of the right-handed threads of the output-side threaded driver 106 with the right-handed threads of the output brake plate 108 allow relative rotation of the output-side threaded driver 106 with respect to the output brake plate 108, and allow the output-side threaded driver 106 to thread out of the output brake plate 108. Thus, a torque is not transmitted from the output-side threaded driver 106 to the output brake plate 108 and a clockwise torque applied to the central shaft 104 does not cause a hoist, winch, or other similar mechanical device to spool out by transmission of torque through the output-side threaded driver 106 alone.

At the same time, when the clockwise input torque is applied to the central shaft 104 and/or the central shaft 104 is driven or urged to rotate in a clockwise direction (that is, in a reverse direction), the splined outer surface of the central shaft 104 urges the input-side threaded driver 116 to rotate clockwise. Initially, the input brake plate 114 may not be forced to rotate about the central longitudinal axis 102. Thus, the rotation of the input-side threaded driver 116 and the engagement of the right-handed threads of the input-side threaded driver 116 with the right-handed threads of the input brake plate 114 cause the input-side threaded driver 116 to thread into and move toward the input brake plate 114 until the head portion 144 of the input-side threaded driver 116 abuts and bears against the input brake plate 114, at which point, the input-side threaded driver 116 can no longer thread into the input brake plate 114 and the input brake plate 114 is forced to rotate clockwise about the central longitudinal axis 102. In this way, a torque can be transmitted from the central shaft 104 to the input brake plate 114. During this operation, the output brake plate 108 is not rotating and the input brake plate 114 is rotating clockwise. Thus, the input brake plate 114 threads out of the output brake plate 108 and travels longitudinally away from the output brake plate 108, and the brake remains in an at least partially released configuration, as described elsewhere herein.

As described elsewhere herein, the central shaft 104 includes a first, output-end circumferential groove 122 and a second, input-end circumferential groove 124. In some embodiments, a respective retaining ring may be seated within each of the output-end circumferential groove 122 and the input-end circumferential groove 124, to limit travel of the other components of the brake mounted on the central shaft 104. In particular, seating a respective retaining ring within each of the output-end circumferential groove 122 and the input-end circumferential groove 124 limits travel of the output-side threaded driver 106 and the input-side threaded driver 116 away from one another and prevents disassembly of the components of the brake 100 described herein. That is, a retaining ring seated within the output-end circumferential groove 122 prevents the output-side threaded driver 106 from traveling longitudinally along the length of the central shaft 104 beyond the output-end circumferential groove 122, and a retaining ring seated within the input-end circumferential groove 124 prevents the input-side threaded driver 116 from traveling longitudinally along the length of the central shaft 104 beyond the input-end circumferential groove 124.

Thus, with the retaining rings installed in the grooves 122 and 124, when a clockwise input torque is applied to the central shaft 104 and/or the central shaft 104 is driven or urged to rotate in a clockwise direction, but a load is not independently applied to the output brake plate 108 and the output brake plate 108 is not independently urged to rotate in a reverse direction, the engagement of the right-handed threads of the output-side threaded driver 106 with the right-handed threads of the output brake plate 108 allow the output-side threaded driver 106 to thread out of the output brake plate 108 until the output-side threaded driver 106 contacts, abuts against, or engages with a surface of the retaining ring seated in the groove 122, thereby limiting travel of the output-side threaded driver 106 along the central shaft 104. At the same time, the input brake plate 114 threads out of the output brake plate 108 and travels longitudinally away from the output brake plate 108 until the input-side threaded driver 116 contacts, abuts against, or engages with a surface of the retaining ring seated in the groove 124, thereby limiting travel of the input-side threaded driver 116 and the input brake plate 114 along the central shaft 104.

Once travel of the threaded drivers 106, 116 is limited in this way, continued application of a clockwise torque to the central shaft 104 causes clockwise rotation of the output brake plate 108 and the input brake plate 114. Thus, a torque is transmitted to the output brake plate 108 and a clockwise torque applied to the central shaft 104 does cause a hoist, winch, or other similar mechanical device coupled to the output brake plate 108 to spool out by transmission of torque. In particular, clockwise rotation of the central shaft 104 forces clockwise rotation of the output-side threaded driver 106, and clockwise rotation of the output-side threaded driver 106, given the right-handed threaded engagement of the output-side threaded driver 106 to the output brake plate 108 and the constraint that the output-side threaded driver 106 and the output brake plate 108 cannot move away from one another, forces clockwise rotation of the output brake plate 108. Similarly, clockwise rotation of the central shaft 104 forces clockwise rotation of the input-side threaded driver 116, and clockwise rotation of the input-side threaded driver 116, given the right-handed threaded engagement of the input-side threaded driver 116 to the input brake plate 114 and the constraint that the input brake plate 114 cannot move away from the output brake plate 108, forces clockwise rotation of the input brake plate 114.

If, after driving a winch or hoist to spool in, that is, to pull a load in, that is, to drive a winch or hoist to lift a load or pull a load toward the winch or hoist, the source of mechanical power is decoupled or disconnected from the central shaft 104, or for any reason fails or ceases to apply a torque to the central shaft 104, and a torque is applied to the output brake plate 108 urging the output brake plate 108 to rotate counter-clockwise (e.g., if an operator attempts to manually spool in a winch or hoist), then the counter-clockwise torque drives the output-side threaded driver 106 to travel longitudinally along the central shaft 104 away from the output brake plate 108 until the output-side threaded driver 106 engages the retaining ring seated in the output-end circumferential groove 122. Once the output-side threaded driver 106 engages the retaining ring seated in the output-end circumferential groove 122, torque is transmitted through the output brake plate 108 to the output-side threaded driver 106, through the output-side threaded driver 106 to the central shaft 104, and through the central shaft 104 to the input-side threaded driver 116, driving the input-side threaded driver 116 to travel longitudinally along the central shaft 104 away from the input brake plate 114 until the input-side threaded driver 116 engages the retaining ring seated in the input-end circumferential groove 124. Once the input-side threaded driver 116 engages the retaining ring seated in the input-end circumferential groove 124, torque is transmitted through the input-side threaded driver 116 to the input brake plate 114, forcing the input brake plate 114 to rotate counter-clockwise. During this operation, the output brake plate 108 and the input brake plate 114 rotate in the same direction (counter-clockwise) and at the same speed (the speed of the central shaft 104). Thus, the output brake plate 108 and the input brake plate 114 do not thread into or out of one another and the brake remains in an at least partially released configuration, as described elsewhere herein.

As described herein, the output brake plate 108 may be restrained against travelling longitudinally along the central shaft 104 and the central longitudinal axis 102. In alternative implementations, however, the output brake plate 108 may be translatable longitudinally along the central shaft 104 and the central longitudinal axis 102. As described herein, the input brake plate 114 may be translatable longitudinally along the central shaft 104 and the central longitudinal axis 102. In alternative implementations, however, the input brake plate 114 may be restrained against travelling longitudinally along the central shaft 104 and the central longitudinal axis 102.

The internal components of the mechanical brake 100 described herein include exactly three friction discs 110a, 110b, 110c and exactly two stator plates 112a, 112b. In alternative implementations, however, a mechanical brake may include exactly two friction discs or exactly four or more friction discs, and/or exactly one stator plate or exactly three or more stator plates. In general, components of a brake as described herein will typically have one more friction disc than stator plate.

The components described herein include right-handed threads and left-handed threads. The relationships between the handedness of the threaded components described herein are important, but in one alternative embodiment, the handedness of all components described herein may be reversed, that is, all right-handed threads described herein may be switched to left-handed threads and all left-handed threads described herein may be switched to right-handed threads.

For the embodiments described herein, a counter-clockwise torque applied to the central shaft 104 drives the system and a winch, hoist, or other similar device coupled thereto in a forward direction and a clockwise torque applied to the central shaft 104 drives the system and a winch, hoist, or other similar device coupled thereto in a reverse direction. In alternative embodiments, however, the forward and reverse directions may be swapped, such that a counter-clockwise torque applied to the central shaft 104 drives the system and a winch, hoist, or other similar device coupled thereto in a reverse direction and a clockwise torque applied to the central shaft 104 drives the system and a winch, hoist, or other similar device coupled thereto in a forward direction.

In the embodiments described herein, the output-side threaded driver 106 and the input-side threaded driver 116 are located outside of the output brake plate 108 and the input brake plate 114, respectively. That is, the output-side threaded driver 106 is located closer to the output end of the central shaft 104 than the output brake plate 108 and the input-side threaded driver 116 is located closer to the input end of the central shaft 104 than the input brake plate 114. In alternative embodiments, however, these relationships can be reversed, e.g., such that the output-side threaded driver 106 and the input-side threaded driver 116 are located inside of the output brake plate 108 and the input brake plate 114, respectively. That is, the output brake plate 108 could be located closer to the output end of the central shaft 104 than the output-side threaded driver 106 and the input brake plate 114 could be located closer to the input end of the central shaft 104 than the input-side threaded driver 116.

One specific advantage of the brake system components described herein is that they can be used to assemble a brake that does not include a ratchet or any ratchet components. A brake or a clutch including the components described herein may be "load-sensing" in the sense that a braking function can be activated without independent action of a human operator. A brake or a clutch including the components described herein may also be "self-adjusting" in the sense that, as the friction discs 110a, 110b, and 110c wear over time and use, the braking function does not lose effectiveness.

The various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system, comprising:
a central shaft to be coupled to a source of mechanical power;
an input brake plate;
an output brake plate coupled to a mechanical device to be powered by the source of mechanical power; and
a stator plate located between the input brake plate and the output brake plate;
wherein when the source of mechanical power applies a first input torque to the central shaft, the first input torque is transmitted from the central shaft through the output brake plate to the mechanical device and drives operation of the mechanical device in a forward direction;
wherein when the source of mechanical power applies a second input torque to the central shaft, the second input torque is transmitted from the central shaft to the input brake plate to allow operation of the mechanical device in a reverse direction; and
wherein when the source of mechanical power does not apply a torque to the central shaft and the mechanical device is biased toward the reverse direction, the mechanical device applies a third input torque to the output brake plate, the stator plate is compressed between the input brake plate and the output brake plate, and compression of the stator plate between the input brake plate and the output brake plate prevents rotation of the output brake plate.

2. The system of claim 1 wherein the system is a brake.

3. The system of claim 1 wherein the system is a clutch.

4. The system of claim 1 wherein the mechanical device is a winch.

5. The system of claim 1 wherein the mechanical device is a hoist.

6. The system of claim 1 wherein the system does not include a ratchet.

7. The system of claim 1 wherein when the source of mechanical power applies the first input torque to the central shaft, compression of the stator plate between the input brake plate and the output brake plate is reduced.

8. The system of claim 1 wherein when the source of mechanical power applies the second input torque to the central shaft, compression of the stator plate between the input brake plate and the output brake plate is controlled to allow operation of the mechanical device in the reverse direction.

9. The system of claim 1 wherein when the source of mechanical power does not apply a torque to the central shaft and the mechanical device is biased toward the forward direction, the mechanical device applies a fourth input torque to the output brake plate that drives rotation of the output brake plate, the central shaft, and the input brake plate.

10. A system, comprising:
a central shaft to be coupled to a source of mechanical power;
an input-side driver coupled to an input end portion of the central shaft;
an input brake plate coupled to the input-side driver;
an output-side driver coupled to an output end portion of the central shaft;
an output brake plate coupled to the output-side driver, to the input brake plate, and to a mechanical device to be powered by the source of mechanical power; and
a stator plate located between the input brake plate and the output brake plate;
wherein when the source of mechanical power applies a first input torque to the central shaft, the first input torque is transmitted from the central shaft to the output-side driver, through the output-side driver to the output brake plate, and through the output brake plate to the mechanical device to drive operation of the mechanical device in a forward direction;
wherein when the source of mechanical power applies a second input torque to the central shaft, the second input torque is transmitted from the central shaft to the input-side driver and through the input-side driver to the input brake plate to allow operation of the mechanical device in a reverse direction; and
wherein when the source of mechanical power does not apply a torque to the central shaft and the mechanical device is biased toward the reverse direction, the mechanical device applies a third input torque to the output brake plate, the stator plate is compressed between the input brake plate and the output brake plate, and compression of the stator plate between the input brake plate and the output brake plate prevents rotation of the output brake plate.

11. The system of claim 10 wherein the input-side driver is rotationally locked to the input end portion of the central shaft.

12. The system of claim 10 wherein the output-side driver is rotationally locked to the output end portion of the central shaft.

13. The system of claim 10 wherein the output brake plate is threaded to the output-side driver.

14. The system of claim 13 wherein the input brake plate is threaded to the input-side driver.

15. The system of claim 14 wherein a first handedness of a first threaded engagement of the output brake plate to the output-side driver matches a second handedness of a second threaded engagement of the input brake plate to the input-side driver.

16. The system of claim 15 wherein the output brake plate is threaded to the input brake plate and a third handedness of a third threaded engagement of the output brake plate to the input brake plate is opposite to the first handedness and the second handedness.

17. The system of claim 10, wherein the stator plate is a first stator plate and the system further comprises:
- a second stator plate located between the input brake plate and the output brake plate;
- a first friction disc located between the input brake plate and the first stator plate;
- a second friction disc located between the first stator plate and the second stator plate; and
- a third friction disc located between the second stator plate and the output brake plate.

18. A method of operating a system including a central shaft, an input brake plate, an output brake plate coupled to a mechanical device, and a stator plate located between the input brake plate and the output brake plate, the method comprising:
- applying a forward input torque to the central shaft;
- transmitting the forward input torque from the central shaft through the output brake plate to the mechanical device, thereby driving forward operation of the mechanical device;
- removing the forward input torque from the central shaft, thereby allowing the mechanical device to bias the output brake plate in a reverse direction, thereby causing the stator plate to be compressed between the input brake plate and the output brake plate, thereby preventing rotation of the output brake plate;
- applying a reverse input torque to the central shaft; and
- transmitting the reverse input torque from the central shaft to the input brake plate to allow operation of the mechanical device in reverse.

19. The method of claim 18 wherein applying the forward input torque to the central shaft reduces compression of the stator plate between the input brake plate and the output brake plate and applying the reverse input torque to the central shaft controls compression of the stator plate between the input brake plate and the output brake plate to allow operation of the mechanical device in reverse.

20. The method of claim 18, further comprising operating the mechanical device to bias the output brake plate in a forward direction, thereby driving rotation of the output brake plate, the central shaft, and the input brake plate.

* * * * *